US009472184B2

United States Patent
Tjalve et al.

(10) Patent No.: US 9,472,184 B2
(45) Date of Patent: Oct. 18, 2016

(54) CROSS-LANGUAGE SPEECH RECOGNITION

(71) Applicant: MICROSOFT TECHNOLOGY LICENSING, LLC, Redmond, WA (US)

(72) Inventors: Michael Tjalve, Bellevue, WA (US); Pavan Karnam, Seattle, WA (US); Dennis Mooney, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 143 days.

(21) Appl. No.: 14/073,774

(22) Filed: Nov. 6, 2013

(65) Prior Publication Data

US 2015/0127339 A1    May 7, 2015

(51) Int. Cl.
| | |
|---|---|
| *G10L 15/00* | (2013.01) |
| *G06F 17/27* | (2006.01) |
| *G10L 15/187* | (2013.01) |
| *G10L 15/22* | (2006.01) |
| *G10L 15/02* | (2006.01) |

(52) U.S. Cl.
CPC ........... *G10L 15/005* (2013.01); *G06F 17/275* (2013.01); *G10L 15/187* (2013.01); *G10L 2015/025* (2013.01); *G10L 2015/225* (2013.01)

(58) Field of Classification Search
None
See application file for complete search history.

(56) References Cited

U.S. PATENT DOCUMENTS

| | | | | |
|---|---|---|---|---|
| 6,085,160 A * | 7/2000 | D'hoore | ................. | G09B 19/06 704/2 |
| 7,013,276 B2 | 3/2006 | Bickley et al. | | |
| 7,752,045 B2 * | 7/2010 | Eskenazi | ................ | G09B 19/04 704/231 |
| 7,844,457 B2 | 11/2010 | Chen et al. | | |
| 2002/0111805 A1 | 8/2002 | Goronzy et al. | | |
| 2004/0098259 A1 * | 5/2004 | Niedermair | ........... | G10L 15/005 704/254 |
| 2005/0049860 A1 * | 3/2005 | Junqua | .................. | H04M 1/271 704/231 |
| 2006/0020463 A1 | 1/2006 | Reich | | |
| 2006/0155538 A1 * | 7/2006 | Higgins | ................. | G09B 19/06 704/246 |
| 2010/0145698 A1 * | 6/2010 | Chen | ........................ | G09B 7/02 704/256.1 |
| 2013/0132069 A1 * | 5/2013 | Wouters | .................. | G06F 17/28 704/8 |
| 2014/0006029 A1 * | 1/2014 | Stanley | .................. | G10L 15/19 704/254 |

OTHER PUBLICATIONS

Bouselmi, Ghazi et al., "Fully Automated Non-Native Speech Recognition Using Confusion-Based Acoustic Model Integration and Graphemic Constraints," Proceedings of the International Conference on Acoustics, Speech and Signal Processing, May 2006, 4 pages.

(Continued)

*Primary Examiner* — Huyen Vo
*Assistant Examiner* — Yi-Sheng Wang
(74) *Attorney, Agent, or Firm* — Gregg Wisdom; Judy Yee; Micky Minhas

(57) ABSTRACT

Embodiments that relate to identifying potential cross-language speech recognition problems are disclosed. For example, in one disclosed embodiment a speech recognition problem detection program receives a target word in a non-native language from a target application. A phonetic transcription of the target word comprising a plurality of target phonetic units is acquired. The program determines that at least one of the target phonetic units is not found in a plurality of native phonetic units associated with a native language. In response, a warning of the potential cross-language speech recognition problem may be outputted for display on a display device. The warning may comprise the target word.

20 Claims, 4 Drawing Sheets

(56) References Cited

OTHER PUBLICATIONS

Karanasou, Panagiota et al., "Measuring the Confusability of Pronunciations in Speech Recognition," Proceedings of the 9th International Workshop on Finite State Methods and Natural Language Processing, Jul. 2011, 9 pages.

Lin, Hui et al., "A Study on Multilingual Acoustic Modeling for Large Vocabulary ASR," Proceedings of the International Conference on Acoustics, Speech and Signal Processing, Apr. 2009, 4 pages.

Shen, Wade et al., "Improving Phonotactic Language Recognition with Acoustic Adaptation," Interspeech, Aug. 2007, 4 pages.

Yu, Dong et al., "Cross-Lingual Speech Recognition Under Runtime Resource Constraints," Proceedings of the International Conference on Acoustics, Speech and Signal Processing, Apr. 2009, 4 pages.

\* cited by examiner

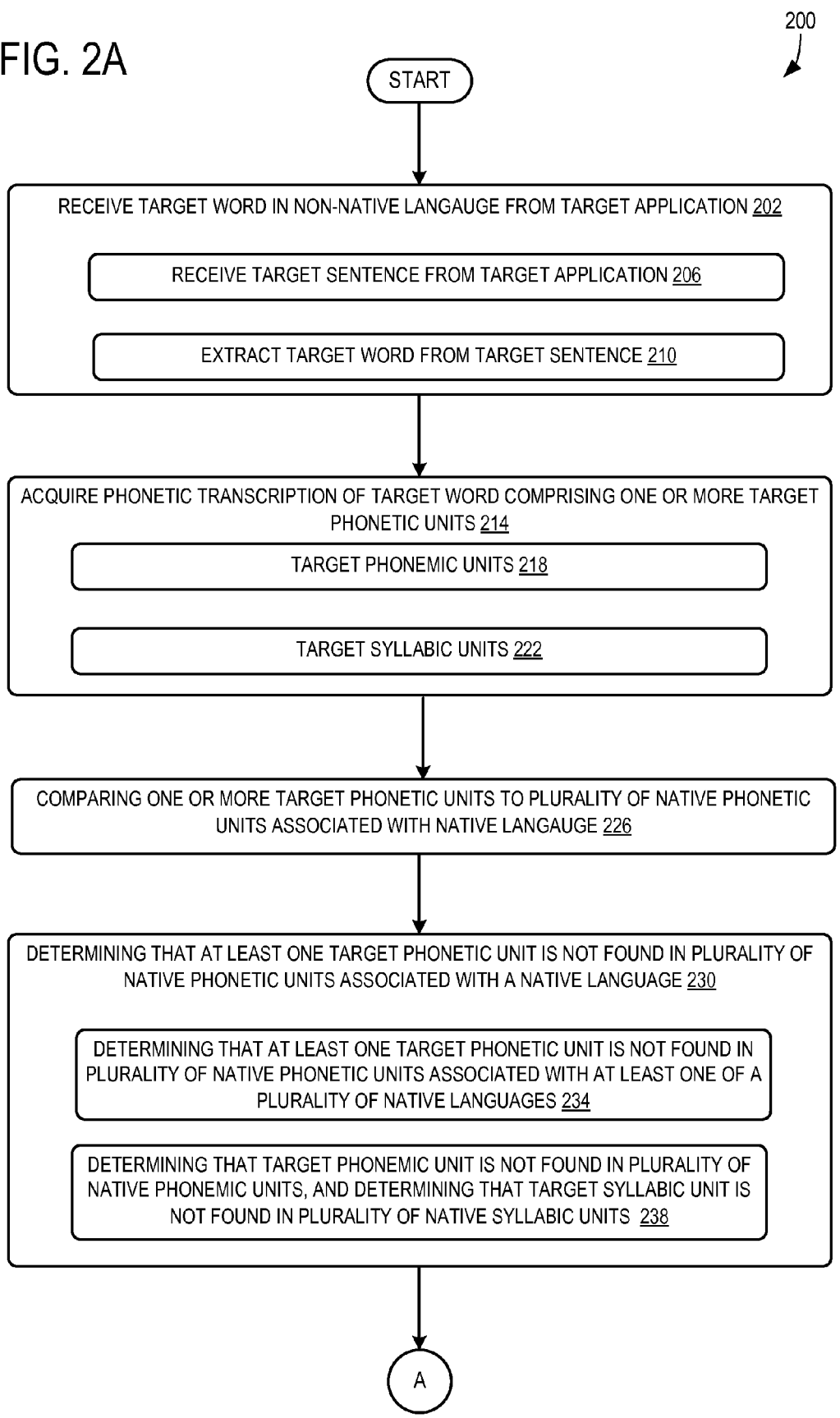

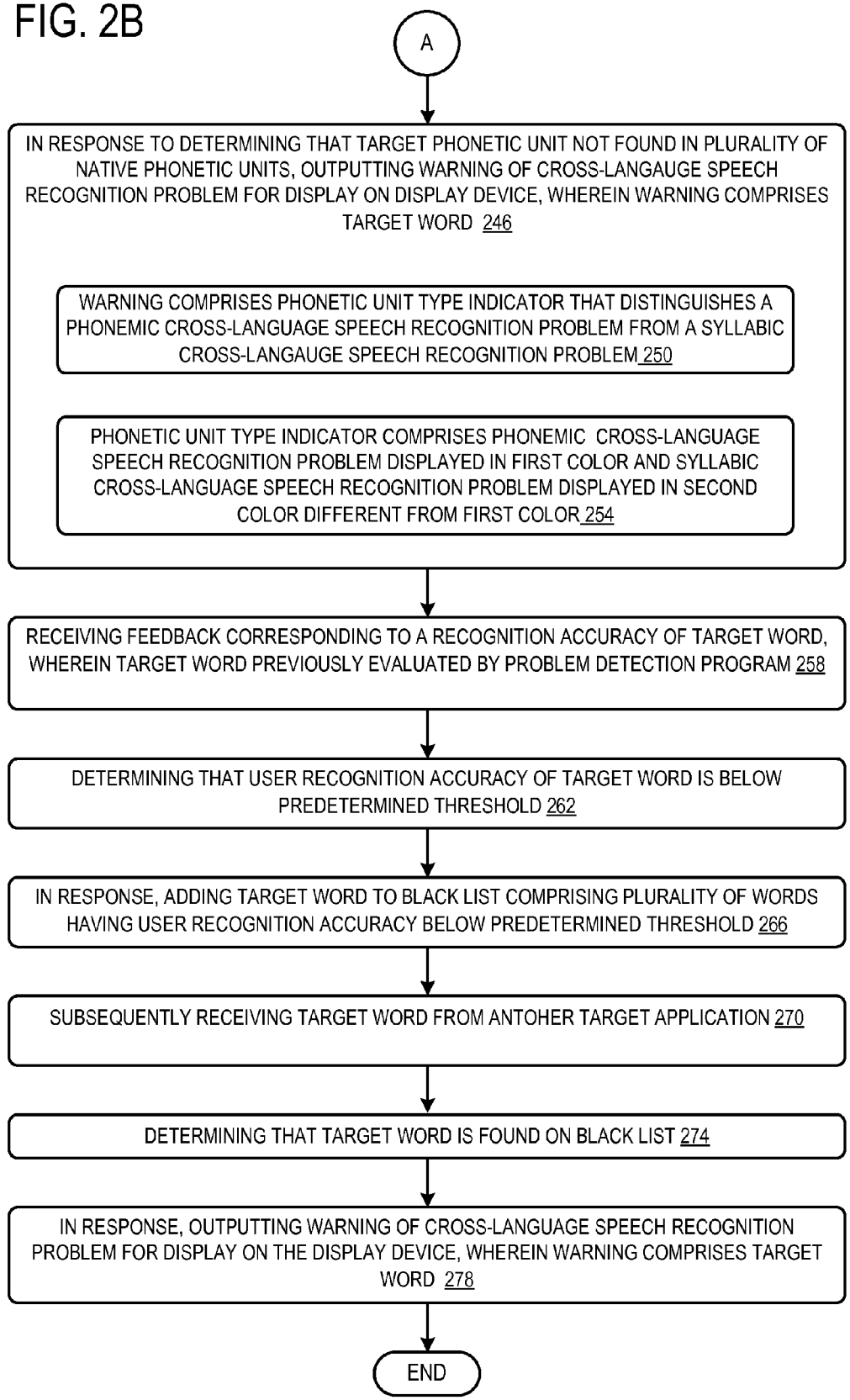

CROSS-LANGUAGE SPEECH RECOGNITION

BACKGROUND

Applications that include or are configured for use with a speech recognition interface enable users to interact with the application via voice commands. In developing such applications, a developer may configure the application to respond to words that may be spoken by a user in one or more languages. In many situations, a user who speaks a native language will utilize the application. While interacting with the application, the native language user may provide a voice command that contains one or more words in a different, non-native language. For example, where the application is a media content application and the user is a native French speaker, the user may speak a voice command to play a song title that contains one or more English words.

Automatic speech recognition can be challenging in such cross-language scenarios, i.e. when a native speaker of one language (L1) speaks words from a different language (L2) which leads to non-native pronunciations. Such challenges may arise from differences in the phonological, phonetic or phonotactic structures of the native language L1 of the user as compared to the non-native language-origin L2 of the word. In these situations, the pronunciation of the word in the non-native language L2 by the native speaker of L1 may differ from the pronunciation of the word expected by a speech recognition interface.

Further, developers of applications that support such cross-language scenarios may fail to recognize such word recognition challenges when developing their applications. In these cases, the developers may proceed with development and include non-native language words that may be spoken by users who speak a different, native language. In some situations, cross-language speech recognition issues with one or more words may not be identified until late in the development process, such as during beta testing with actual users. In other situations, such cross-language speech recognition issues may go undetected and be recognized after the application is in the field and user complaints are received. In either case, implementing fixes at these stages can be disruptive and costly.

SUMMARY

Various embodiments are disclosed herein that relate to speech recognition problem detectors. For example, one disclosed embodiment provides a method for identifying a cross-language speech recognition problem. The method includes receiving a target word in a non-native language from a target application. A phonetic transcription of the target word comprising a plurality of target phonetic units is acquired.

The method includes determining that at least one of the target phonetic units is not found in a plurality of native phonetic units associated with a native language. In response to determining that the at least one target phonetic unit is not found in the plurality of native phonetic units associated with the native language, a warning of the cross-language speech recognition problem is outputted for display on a display device. The warning may comprise the target word.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 2A and 2B are a flow chart of a method for identifying a cross-language speech recognition problem according to an embodiment of the present disclosure.

DETAILED DESCRIPTION

Figure 1:
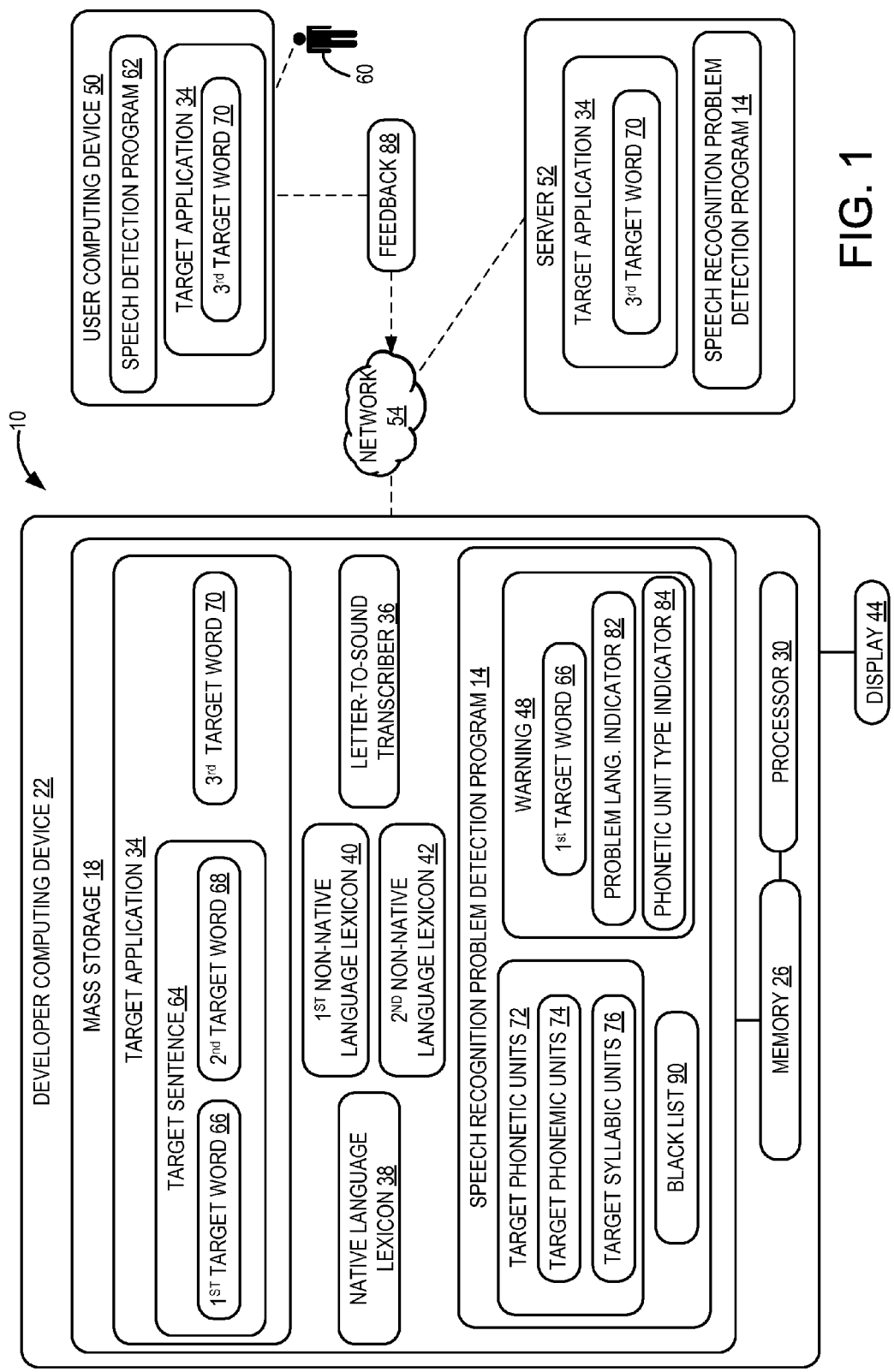
FIG. 1 is a schematic view of a speech recognition problem detector according to an embodiment of the present disclosure.

FIG. 1 shows a schematic view of one embodiment of a speech recognition problem detector 10. The speech recognition problem detector 10 includes a speech recognition problem detection program 14 that may be stored in mass storage 18 of a developer computing device 22. The speech recognition problem detection program 14 may be loaded into memory 26 and executed by a processor 30 of the developer computing device 22 to perform one or more of the methods and processes described in more detail below. Also and as described in more detail below, in one example the mass storage 18 may further include a target application 34, a letter-to-sound transcriber 36, one or more native language lexicons 38, a first non-native language lexicon 40, and a second non-native language lexicon 42.

The developer computing device 22 may take the form of a desktop computing device, a mobile computing device such as a smart phone, laptop, notebook or tablet computer, network computer, or other suitable type of computing device. As shown in FIG. 1, the developer computing device 22 may further include or be communicatively coupled with a display device 44 which may include one or more audio speakers. As described in more detail below, the problem detection program 14 may generate a warning 48 that may be outputted for display on the display device 44 and/or for audio broadcast via the display device or separate audio device. Additional details regarding the components and computing aspects of the developer computing device 22 are described in more detail below with reference to FIG. 3.

In some examples, the developer computing device 22 may be operatively connected with one or more other computing devices using a wired connection, or may employ a wireless connection via WiFi, Bluetooth, or any other suitable wireless communication protocol. As shown in FIG. 1, such other computing devices may include a user computing device 50 and a server 52. For example, the developer computing device 22 may be communicatively coupled to a network 54. The network 54 may take the form of a local area network (LAN), wide area network (WAN), wired network, wireless network, personal area network, or a combination thereof, and may include the Internet.

Descriptions of example use cases and embodiments of the speech recognition problem detector 10 will now be provided. In one example use case, a developer may be developing a target application 34 that is configured to receive and execute voice commands from a user. For example, the target application 34 may be a dance game in which a user selects a song and dances to the song. The target application 34 may be configured to display a library of song titles via a display device associated with the computing device on which the application is running. The user may search for and select a favorite song from the library via voice commands. For example, an end user 60 may interact with the target application 34 via a speech detection program 62 on the user computing device 50 by providing voice commands to select a song title and start a session of the dance game.

In developing the target application 34, the dance game developer may import or build the library of song titles. The developer may also build an interface vocabulary of words and phrases that the end user 60 will use in voice commands to interact with the target application 34. As described in more detail below, the song titles and interface vocabulary may comprise target sentences 64 and target words, such as first target word 66, second target word 68 and third target word 70. Where the target application 34 will be sold in regions having a particular native language, the vocabulary of words and phrases may be provided in that native language. For example, a target application 34 that will be sold in Germany may be localized to include an interface vocabulary of German words and phrases.

In this example, German songs may be included in the library of song titles. In addition, the developer may include other song titles and/or other content that is in one or more non-native (non-German) languages. For example, the developer may include one or more popular songs having English song titles. In some cases, an English song title may have one or more words that are difficult for a native German speaker to pronounce correctly. Additionally, even if the native German speaker can pronounce the English word correctly, there may be limitations to which phonemes are available during speech recognition.

For example, the German language phoneme set does not include a phonemic unit corresponding to a /th/ sound. Thus, native German speakers often have difficulty pronouncing words that include a /th/ sound, as in words such as "thing" or "thoughtful." Accordingly, the pronunciation of the word "thoughtful" by a native German speaker may sound quite different from the pronunciation of "thoughtful" by a native English speaker. In this case, even if the speech detection program 62 on the user computing device 50 is configured to recognize the word "thoughtful" as pronounced by a native English speaker, it may not recognize an incorrect pronunciation of "thoughtful" as voiced by a native German speaker.

Similarly, different languages often have differences in the phonotactic structures of words, such as at the syllable level. For example, the English language includes the word-initial cluster [sk], such as in the word "school." While the two phonemes [s] and [k] both exist in the Spanish language, the cluster [sk] does not exist in a word-initial position. Additionally, when attempting to pronounce an English word with a word-initial cluster [sk], native Spanish speakers often have a tendency to insert a vowel at the beginning of the word. For example, a native Spanish speaker may pronounce the word "school" as "eh-school". It will be appreciated that other examples of cross-language speech recognition issues may exist between many different pairs of languages and for many different phonotactic structures.

With reference again to FIG. 1, in one example a developer of a target application 34 for native German speakers may utilize the speech recognition problem detection program 14 to identify cross-language speech recognition problems during development of the target application. As shown in FIG. 1, the speech recognition problem detection program 14 may be stored in mass storage 18 of developer computing device 22. In other examples, the speech recognition target detection program 14 may be stored remotely from the developer computing device 22, such as on server 52, and a developer may access the program via developer computing device 22 as a cloud-based service.

The speech recognition problem detection program 14 may receive a target sentence 64, such as a text string, from the target application 34. The speech recognition problem detection program 14 may then extract a first target word 66 from the target sentence 64. It will also be appreciated that in other examples an individual target word, such as third target word 70, may be received from the target application. In other examples, one or more target sentences 64 and/or individual target words associated with the target application 34 may be located remotely from the developer computing device 22, such as on the server 52.

The speech recognition problem detection program 14 may then determine whether the first target word 66 is a foreign-origin or non-native word. For example, the speech recognition problem detection program 14 may compare the first target word 66 with a plurality of words in a first non-native language lexicon 40. If a match is found, then the speech recognition problem detection program 14 may identify the first target word 66 as a word from the first non-native language. If a match is not found, then the speech recognition problem detection program 14 may compare the first target word 66 with a plurality of words in a second non-native language lexicon 42. If a match is found, then the problem detection program 14 may identify the first target word 66 as a word from the second non-native language.

In the example shown in FIG. 1, the first non-native language lexicon 40 and second non-native language lexicon 42 are stored in mass storage 18 of the developer computing device 22. In other examples, the first non-native language lexicon 40 and second non-native language lexicon 42 may be stored remotely, such as at server 52, and accessed by the computing device 22 via network 54. It will also be appreciated that the speech recognition problem detection program 14 may compare the first target word 66 with a plurality of words in any suitable number of non-native language lexicons, such as five, ten, 50, 100, or other suitable number.

In other examples, the language of origin of the first target word 66 may be determined using a programmatic language identification tool. For example, a natural language processing program may utilize one or more statistical methods to analyze the text of the first target word 66 to determine the language of origin of the word.

With the first target word 66 identified as a word from a non-native language, the speech recognition problem detection program 14 may then acquire a phonetic transcription of the first target word 66. As described in more detail below, the phonetic transcription may comprise a plurality of target phonetic units 72, such as one or more target phonemic units 74 and/or one or more target syllabic units 76. It will be appreciated that other examples of target phonetic units 72 may also be utilized including, but not limited to, word units and cross-syllable units. In one example, the phonetic transcription may be acquired from the non-native language lexicon corresponding to the first target word. For example, the corresponding non-native language lexicon may include the phonetic transcription of the first target word 66. In other examples, a letter-to-sound transcriber 36 may be utilized to generate the phonetic transcription of the first target word 66.

Once the phonetic transcription has been acquired, the speech recognition problem detection program 14 may compare at least one of the target phonetic units 72 of the first target word 66 to an inventory of native phonetic units associated with the native language. In the example shown in FIG. 1, the inventory of native phonetic units of the native language may be located in a native language lexicon 38. In one example, the speech recognition problem detection program 14 may compare the target phonemic units of the first target word 66 with an inventory of native phonemic units associated with the native language.

For example, the speech recognition problem detection program 14 may compare each of the individual target phonemes that comprise the first target word 66 to the inventory of native phonemes associated with the native language. If the speech recognition problem detection program 14 determines that a target phoneme of the first target word 66 is not found in the inventory of native phonemes associated with the native language, then the problem detection program 14 may output a warning 48 of a cross-language speech recognition problem for display on the display device 44.

In another example, the speech recognition problem detection program 14 may compare each of the individual target phonemes that comprise the first target word 66 to a list of challenging and/or unpronounceable native phonemes that are associated with the native language and tend to create cross-language pronunciation problems and therefore speech recognition problems. If the speech recognition problem detection program 14 determines that a target phoneme of the first target word 66 matches a challenging or unpronounceable native phoneme associated with the native language, then the problem detection program 14 may similarly output a warning 48 of a cross-language speech recognition problem for display on the display device 44.

Advantageously, in this manner the speech recognition problem detection program 14 may alert a developer to a cross-language speech recognition problem during development of an application. Additionally, to further assist the developer in identifying and addressing the problem, the warning 48 may include the first target word 66 and/or a problem language indicator that indicates the native language that presents the cross-language speech recognition problem. In some examples, the warning 48 may also include an estimated level of risk that the first target word 66 will create a speech recognition problem.

In one example, the warning 48 may comprise a written message displayed on display device 44, such as "Native German speakers often mispronounce the word Thoughtful." In other examples the warning 48 may be worded differently, such as "Native Language—German; Problem word—Thoughtful." In other examples, the warning 48 may further include the non-native language of the first target word 66. For example, the warning 48 may read, "Native German speakers often mispronounce the English word Thoughtful." In other examples, the warning 48 may comprise an audio warning including the first target word 66 and indicating the native language that presents the cross-language speech recognition problem. It will also be appreciated that the potential advantages of the speech recognition problem detection program 14 may be realized without the use of a speech detection program or related functionality.

In another example, the speech recognition problem detection program 14 may compare target syllabic units 76 of the first target word 66 with an inventory of native syllabic units associated with the native language. Alternatively expressed, the speech recognition problem detection program 14 may compare each syllable of the first target word 66 with an inventory of native syllabic units associated with the native language. Syllabic units may include, but are not limited to, word-initial phoneme clusters or combinations, mid-word phoneme clusters or combinations, and word-ending phoneme clusters.

For example, the speech recognition problem detection program 14 may compare each of the target syllabic units 76 that comprise the first target word 66 to an inventory of native syllabic units associated with the native language. Such an inventory of native syllabic units may be located, for example, in the native language lexicon 38. If the speech recognition problem detection program 14 determines that a target syllabic unit of the first target word 66 is not found in the inventory of native syllabic units associated with the native language, then the program may output the warning 48 of a cross-language speech recognition problem for display on the display device 44.

In some examples, comparing syllabic units as described above may identify potential cross-language speech recognition problems that may not be identified by comparing phonemic units. For example, each of the individual target phonemic units 74 of the first target word 66 may be found in the inventory of native phonemic units of the native language. However, a cluster of target phonemes in the first target word 66 may not be found in the inventory of native syllabic units of the native language. The example discussed above regarding the word-initial consonant cluster /sk/ in English, and the absence of such a cluster in a word-initial position in the Spanish language, serves as an illustration.

In another example, the individual phonemes /p/ and /f/ are present in both English and German. The phoneme cluster /pf/ is valid in German and may be used in a word-initial position, such as in the word "Pferd" (English translation—horse). However, in English the phoneme cluster /pf/ is limited to use across syllable boundaries, such as in the word "upfront", and is not used in a word-initial position. Thus, where the native language is English, the non-native German word "Pferd" may create a cross-language speech recognition problem.

In other examples, the speech recognition problem detection program 14 may perform both phonemic unit comparisons and syllabic unit comparisons on the first target word 66 as described above. In these examples, additional cross-language speech recognition problems may be identified as compared to performing just one or the other of a phonemic unit comparison or syllabic unit comparison. Further, in some examples a combined risk score reflecting an estimated level of risk that the first target word 66 will create a speech recognition problem may be provided.

In some examples, the speech recognition problem detection program 14 may determine the type of phonetic unit comparison(s) to be performed based on, for example, the native language with which the target application 34 will be used and the non-native language of the first target word 66. For example, where a particular native language and a non-native language pairing is known to have a cross-language speech recognition problem occurrence rate that is above a predetermined threshold, then the speech recognition problem detection program 14 may perform both phonemic unit comparisons and syllabic unit comparisons on target words as described above.

In another example, the warning 48 generated by the speech recognition problem detection program 14 may also include a phonetic unit type indicator that distinguishes a phonemic cross-language speech recognition problem from a syllabic cross-language speech recognition problem. For example, the warning 48 may include an icon "P" to indicate a phonemic cross-language speech recognition problem, or an icon "S" to indicate a syllabic cross-language speech recognition problem.

In other examples, a phonetic unit type indicator may comprise a phonemic cross-language speech recognition problem displayed in a first color and a syllabic cross-language speech recognition problem displayed in a second color different from the first color. For example, the warning 48 may include a written message displayed in yellow to indicate a phonemic cross-language speech recognition problem, or a written message displayed in red to indicate a syllabic cross-language speech recognition problem.

In other examples, a phonetic unit type indicator may distinguish between a phonemic cross-language speech recognition problem and a syllabic cross-language speech recognition problem in other manners. For example, the warning 48 may be displayed in different fonts, with different emphases or highlighting, or in other manners that distinguish between the two types of speech recognition problems. In other examples, different sounds may be generated that correspond to a phonemic cross-language speech recognition problem or a syllabic cross-language speech recognition problem. It will be appreciated that many other forms of different phonetic unit type indicators may also be utilized.

In another example, the warning 48 may comprise displaying the first target word 66 or the target sentence 64 on the display device 44 with a flag adjacent to the word or sentence that indicates the cross-language speech recognition problem. When the developer hovers over the flag, an initial message may be displayed providing additional information regarding the cross-language speech recognition problem, such as, "This word is in English." When the developer selects the flag, a more detailed message regarding the cross-language speech recognition problem may be displayed, such as, "When German speakers say 'Thoughtful', speech recognition issues are often encountered."

Once the first target word 66 has been evaluated by the speech recognition problem detection program 14, a second target word 68, third target word 70, and/or other target words may be evaluated in a manner similar to the first target word discussed above.

In another example, the target application 34 may be configured to generate feedback 88 corresponding to a recognition accuracy of one or more target words. For example, when the target application 34 is used by end user 60, the target application may collect performance statistics related to the recognition accuracy by the speech detection program 62 of target words in non-native languages. Such target words may have been previously evaluated by the speech recognition problem detection program 14. These statistics in the form of feedback 88 may be received by the speech recognition problem detection program 14.

In one example, the speech recognition problem detection program 14 may utilize the feedback 88 to determine that a recognition accuracy of a target word, such as third target word 70, is below a predetermined threshold. The predetermined threshold may correspond to a rate of successful recognition of a target word by a speech detection program 62. For example, the predetermined threshold may be 100%, 95%, 90%, 80%, or any other suitable threshold.

In response to determining that the recognition accuracy of the third target word 70 is below a predetermined threshold, the speech recognition problem detection program 14 may add the third target word 70 to a black list 90 that comprises a plurality of words having a recognition accuracy below the predetermined threshold. Subsequently, the speech recognition problem detection program 14 may receive the third target word 70 from another target application. The speech recognition problem detection program 14 may compare the third target word 70 to the plurality of words in the black list 90, and may determine that the third target word 70 is found on the black list.

In response to determining that the third target word 70 is found on black list 90, the speech recognition problem detection program 14 may output the warning 48 of a cross-language speech recognition problem for display on the display device 44. Advantageously, in this example the speech recognition problem detection program 14 may utilize actual performance data regarding the recognition accuracy of particular target words to identify cross-language speech recognition problems.

In some examples and as noted above, the speech recognition problem detection program 14 may be located on a server 52 and utilized by one or more developers as a cloud-based service. In these examples, cross-language speech recognition performance data from multiple user computing devices may be received and utilized by the speech recognition problem detection program 14 to continuously update and improve the program. Such data may be stored at the server 52 and analyzed to identify cross-language speech recognition accuracy challenges and patterns as well specific problematic words. Using this data, the speech recognition problem detection program 14 may be continuously adapted for improved performance. For example, such data may be utilized to adjust cross-language speech recognition accuracy thresholds and corresponding notification triggers, update a black list of words having a recognition accuracy below a predetermined threshold, etc.

FIGS. 2A and 2B illustrate a flow chart of a method 200 for identifying a cross-language speech recognition problem according to an embodiment of the present disclosure. The following description of method 200 is provided with reference to the software and hardware components of the speech recognition problem detector 10 described above and shown in FIG. 1. It will be appreciated that method 200 may also be performed in other contexts using other suitable hardware and software components.

With reference to FIG. 2A, at 202 the method 200 may include receiving a target word in a non-native language from a target application. At 206 the method 200 may include receiving a target sentence from the target application. At 210 the method may include extracting the target word from the target sentence. At 214 the method 200 may include acquiring a phonetic transcription of the target word, where the phonetic transcription comprises a plurality of target phonetic units. At 218 the target phonetic units may comprise target phonemic units. At 222 the target phonetic units may comprise target syllabic units.

At 226 the method 200 may include comparing the one or more target phonetic units to a plurality of native phonetic units that are associated with a native language. At 230 the method 200 may include determining that at least one of the target phonetic units is not found in the plurality of native phonetic units associated with the native language. In some examples, the determination that at least one of the target phonetic units is not found in the plurality of native phonetic units may be made based upon an outcome of comparing the one or more target phonetic units to a plurality of native phonetic units.

At 234 the method 200 may include determining that at least one of the target phonetic units is not found in a plurality of native phonetic units associated with at least one of a plurality of native languages. At 238 the method 200 may include determining that a target phonemic unit of the target word is not found in a plurality of native phonemic units associated with the native language, and determining that a target syllabic unit of the target word is not found in a plurality of native syllabic units associated with the native language.

Turning now to FIG. 2B, at 246 the method 200 may include, in response to determining that the target phonetic unit is not found in the plurality of native phonetic units associated with the native language, outputting a warning of a potential cross-language speech recognition problem for display on a display device, wherein the warning comprises the target word. At 250 the warning may comprise a phonetic unit type indicator that distinguishes a potential phonemic cross-language speech recognition problem from a potential syllabic cross-language speech recognition problem. At 254 the phonetic unit type indicator may comprise a phonemic cross-language speech recognition problem displayed in a first color and a syllabic cross-language speech recognition problem displayed in a second color different from the first color.

At 258 the method 200 may include receiving feedback corresponding to a recognition accuracy of the target word, wherein the target word has been previously evaluated by the problem detection program. At 262 the method 200 may include determining that the recognition accuracy of the target word is below a predetermined threshold. At 266 and in response to determining that the recognition accuracy of the target word is below a predetermined threshold, the method 200 may include adding the target word to a black list comprising a plurality of words having a user recognition accuracy below the predetermined threshold.

At 270 the method 200 may include subsequently receiving the target word from another target application. At 274 the method 200 may include determining that the target word is found on the black list. At 278 and in response to determining that the target word is found on the black list, the method 200 may include outputting a warning of a cross-language speech recognition problem for display on the display device, wherein the warning comprises the target word.

It will be appreciated that method 200 is provided by way of example and is not meant to be limiting. Therefore, it is to be understood that method 200 may include additional and/or alternative steps than those illustrated in FIGS. 2A and 2B. Further, it is to be understood that method 200 may be performed in any suitable order. Further still, it is to be understood that one or more steps may be omitted from method 200 without departing from the scope of this disclosure.

Figure 3:
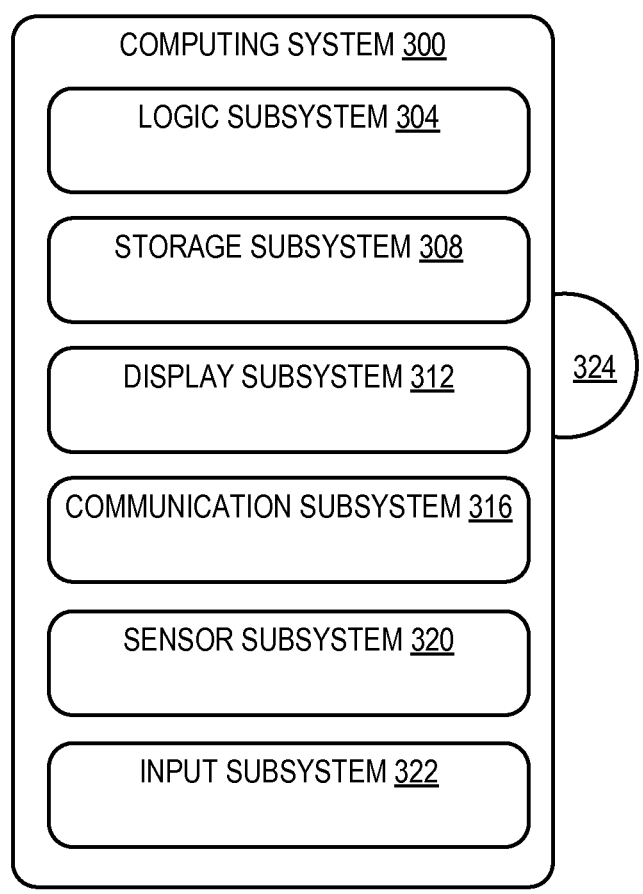
FIG. 3 is a simplified schematic illustration of an embodiment of a computing device.

FIG. 3 schematically shows a nonlimiting embodiment of a computing system 300 that may perform one or more of the above described methods and processes. Developer computing device 22, user computing device 50, and server 52 may take the form of computing system 300. Computing system 300 is shown in simplified form. It is to be understood that virtually any computer architecture may be used without departing from the scope of this disclosure. In different embodiments, computing system 300 may take the form of a mainframe computer, server computer, desktop computer, laptop computer, tablet computer, home entertainment computer, network computing device, mobile computing device, mobile communication device, gaming device, etc.

As shown in FIG. 3, computing system 300 includes a logic subsystem 304 and a storage subsystem 308. Computing system 300 may optionally include a display subsystem 312, a communication subsystem 316, a sensor subsystem 320, an input subsystem 322 and/or other subsystems and components not shown in FIG. 3. Computing system 300 may also include computer readable media, with the computer readable media including computer readable storage media and computer readable communication media. Computing system 300 may also optionally include other user input devices such as microphones, keyboards, mice, game controllers, and/or touch screens, for example. Further, in some embodiments the methods and processes described herein may be implemented as a computer application, computer service, computer API, computer library, and/or other computer program product in a computing system that includes one or more computers.

Logic subsystem 304 may include one or more physical devices configured to execute one or more instructions. For example, the logic subsystem 304 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 304 may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Storage subsystem 308 may include one or more physical, persistent devices configured to hold data and/or instructions executable by the logic subsystem 304 to implement the herein described methods and processes. When such methods and processes are implemented, the state of storage subsystem 308 may be transformed (e.g., to hold different data).

Storage subsystem 308 may include removable media and/or built-in devices. Storage subsystem 308 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Storage subsystem 308 may include devices with one or more of the following characteristics: volatile, nonvolatile, dynamic, static, read/write, read-only, random access, sequential access, location addressable, file addressable, and content addressable.

In some embodiments, aspects of logic subsystem 304 and storage subsystem 308 may be integrated into one or more common devices through which the functionally described herein may be enacted, at least in part. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

FIG. 3 also shows an aspect of the storage subsystem 308 in the form of removable computer readable storage media 324, which may be used to store data and/or instructions executable to implement the methods and processes described herein. Removable computer-readable storage media 324 may take the form of CDs, DVDs, HD-DVDs, Blu-Ray Discs, EEPROMs, and/or floppy disks, among others.

It is to be appreciated that storage subsystem 308 includes one or more physical, persistent devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal via computer-readable communication media.

When included, display subsystem 312 may be used to present a visual representation of data held by storage subsystem 308. As the above described methods and processes change the data held by the storage subsystem 308, and thus transform the state of the storage subsystem, the state of the display subsystem 312 may likewise be transformed to visually represent changes in the underlying data. The display subsystem 312 may include one or more display devices utilizing virtually any type of technology. Such display devices may be combined with logic subsystem 304 and/or storage subsystem 308 in a shared enclosure, or such display devices may be peripheral display devices. The display subsystem 312 may include, for example, the display device 44 shown in FIG. 1.

When included, communication subsystem 316 may be configured to communicatively couple computing system 300 with one or more networks and/or one or more other computing devices. Communication subsystem 316 may include wired and/or wireless communication devices compatible with one or more different communication protocols. As nonlimiting examples, the communication subsystem 316 may be configured for communication via a wireless telephone network, a wireless local area network, a wired local area network, a wireless wide area network, a wired wide area network, etc. In some embodiments, the communication subsystem may allow computing system 300 to send and/or receive messages to and/or from other devices via a network such as the Internet.

Sensor subsystem 320 may include one or more sensors configured to sense different physical phenomenon (e.g., visible light, infrared light, sound, acceleration, orientation, position, etc.). Sensor subsystem 320 may be configured to provide sensor data to logic subsystem 304, for example. As described above, such data may include audio information and any other suitable sensor data that may be used to perform the methods and processes described above.

When included, input subsystem 322 may comprise or interface with one or more sensors or user-input devices such as a microphone, voice recognizer, game controller, gesture input detection device, inertial measurement unit, keyboard, mouse, or touch screen. In some embodiments, the input subsystem 322 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

The term "program" may be used to describe an aspect of the speech recognition problem detector 10 that is implemented to perform one or more particular functions. In some cases, such a program may be instantiated via logic subsystem 304 executing instructions held by storage subsystem 308. It is to be understood that different programs may be instantiated from the same application, service, code block, object, library, routine, API, function, etc. Likewise, the same program may be instantiated by different applications, services, code blocks, objects, routines, APIs, functions, etc. The term "program" is meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. In a computing device and at a speech recognition problem detection program executed on the computing device, a method for identifying a cross-language speech recognition problem, comprising:
   receiving a target word from a target application;
   acquiring a phonetic transcription of the target word comprising one or more target phonetic units;
   determining that at least one of the target phonetic units is not found in a plurality of native phonetic units associated with a native language;
   in response to determining that the at least one target phonetic unit is not found in the plurality of native phonetic units, outputting a warning of the cross-language speech recognition problem for display on a display device, wherein the warning comprises the target word;
   receiving feedback comprising performance statistics related to a recognition accuracy by a speech detection program of the target word, wherein the target word has been previously evaluated by the speech recognition problem detection program;
   utilizing the feedback to determine that the recognition accuracy of the target word is below a predetermined threshold; and
   in response to determining that the recognition accuracy of the target word is below a predetermined threshold, adding the target word to a black list comprising a plurality of words having a recognition accuracy below the predetermined threshold.

2. The method of claim 1, further comprising:
   prior to determining that at least one of the target phonetic units is not found in a plurality of native phonetic units associated with a native language, comparing the one or more target phonetic units to the plurality of native phonetic units associated with the native language, wherein the determining that at least one of the target phonetic units is not found in a plurality of native phonetic units associated with a native language is made based upon an outcome of the comparing.

3. The method of claim 1, wherein the one or more target phonetic units and the plurality of native phonetic units comprise syllabic units or phonemic units.

4. The method of claim 1, wherein the one or more target phonetic units and the plurality of native phonetic units comprise phonemic units and syllabic units, and determining that at least one target phonetic unit is not found in the plurality of native phonetic units further comprises:
determining that a target phonemic unit of the target word is not found in the plurality of native phonemic units associated with the native language; and
determining that a target syllabic unit of the target word is not found in the plurality of native syllabic units associated with the native language.

5. The method of claim 1, further comprising determining that at least one of the target phonetic units is not found in a plurality of native phonetic units associated with at least one of a plurality of native languages.

6. The method of claim 1, wherein the warning further comprises a phonetic unit type indicator that distinguishes a phonemic cross-language speech recognition problem from a syllabic cross-language speech recognition problem.

7. The method of claim 6, wherein the phonetic unit type indicator comprises the phonemic cross-language speech recognition problem displayed in a first color and the syllabic cross-language speech recognition problem displayed in a second color different from the first color.

8. The method of claim 1, further comprising:
subsequently receiving the target word from another target application;
determining that the target word is found on the black list; and
in response to determining that the target word is found on the black list, outputting the warning of the cross-language speech recognition problem for display on the display device, wherein the warning comprises the target word.

9. The method of claim 1, further comprising:
receiving a target sentence from the target application; and
extracting the target word from the target sentence.

10. A speech recognition problem detector for identifying a cross-language speech recognition problem, comprising:
a processor; and
a speech recognition problem detection program comprising instructions executable by the processor and stored in a mass storage of the speech recognition problem detector, the speech recognition problem detection program configured to:
receive a target word from a target application;
acquire a phonetic transcription of the target word comprising one or more target phonetic units;
determine that at least one of the target phonetic units is not found in a plurality of native phonetic units associated with the native language;
in response to determining that the at least one target phonetic unit is not found in the plurality of native phonetic units, output a warning of the cross-language speech recognition problem for display on a display device, wherein the warning comprises the target word;
receive feedback comprising performance statistics related to a recognition accuracy by a speech detection program of the target word, wherein the target word has been previously evaluated by the speech recognition problem detection program;
utilize the feedback to determine that the recognition accuracy of the target word is below a predetermined threshold; and
in response to determining that the recognition accuracy of the target word is below a predetermined threshold, add the target word to a black list comprising a plurality of words having a recognition accuracy below the predetermined threshold.

11. The speech recognition problem detector of claim 10, wherein the speech recognition problem detection program is further configured to, prior to determining that at least one of the target phonetic units is not found in a plurality of native phonetic units associated with a native language, compare the one or more target phonetic units to the plurality of native phonetic units associated with the native language, wherein the determining that at least one of the target phonetic units is not found in a plurality of native phonetic units associated with a native language is made based upon an outcome of the comparing.

12. The speech recognition problem detector of claim 10, wherein the one or more target phonetic units and the plurality of native phonetic units comprise phonemic units or syllabic units.

13. The speech recognition problem detector of claim 10, wherein the one or more target phonetic units and the plurality of native phonetic units comprise phonemic units and syllabic units, and the speech recognition problem detection program is further configured to:
determine that a target phonemic unit of the target word is not found in the plurality of native phonemic units associated with the native language; and
determine that a target syllabic unit of the target word is not found in the plurality of native syllabic units associated with the native language.

14. The speech recognition problem detector of claim 10, wherein the speech recognition problem detection program is further configured to determine that at least one of the target phonetic units is not found in a plurality of native phonetic units associated with at least one of a plurality of native languages.

15. The speech recognition problem detector of claim 10, wherein the warning further comprises a phonetic unit type indicator that distinguishes a phonemic cross-language speech recognition problem from a syllabic cross-language speech recognition problem.

16. The speech recognition problem detector of claim 15, wherein the phonetic unit type indicator comprises the phonemic cross-language speech recognition problem displayed in a first color and the syllabic cross-language speech recognition problem displayed in a second color different from the first color.

17. The speech recognition problem detector of claim 10, wherein the speech recognition problem detection program is further configured to:
subsequently receive the target word from another target application;
determine that the target word is found on the black list; and
in response to determining that the target word is found on the black list, output the warning of the cross-language speech recognition problem for display on the display device, wherein the warning comprises the target word.

18. The speech recognition problem detector of claim 10, wherein the speech recognition problem detection program is further configured to:
 receive a target sentence from the target application; and
 extract the target word from the target sentence.

19. In a computing device and at a speech recognition problem detection program executed on the computing device, a method for identifying a cross-language speech recognition problem, comprising:
 receiving a first target word from a target application;
 acquiring a phonetic transcription of the first target word comprising one or more target phonetic units;
 comparing at least one of the target phonetic units to a plurality of native phonetic units associated with a native language;
 determining that the at least one target phonetic unit is not found in the plurality of native phonetic units associated with the native language;
 in response to determining that the at least one target phonetic unit is not found in the plurality of native phonetic units associated with the native language, outputting a warning of the cross-language speech recognition problem for display on a display device, wherein the warning comprises the first target word and a problem language indicator that indicates the native language;
 receiving feedback comprising performance statistics related to a recognition accuracy by a speech detection program of a second target word, wherein the second target word has been previously evaluated by the speech recognition problem detection program;
 utilizing the feedback, determining that the recognition accuracy by the speech detection program of the second target word is below a predetermined threshold;
 in response to determining that the recognition accuracy of the second target word is below the predetermined threshold, adding the second target word to a black list comprising a plurality of words having a recognition accuracy below the predetermined threshold;
 subsequently receiving the second target word from another target application;
 determining that the second target word is found on the black list; and
 in response to determining that the second target word is found on the black list, outputting the warning of the cross-language speech recognition problem for display on the display device, wherein the warning comprises the second target word and the problem language indicator that indicates the native language.

20. The method of claim 19, wherein the warning further comprises a phonetic unit type indicator that distinguishes a phonemic cross-language speech recognition problem from a syllabic cross-language speech recognition problem.

* * * * *